US012232641B2

(12) United States Patent
Wu

(10) Patent No.: US 12,232,641 B2
(45) Date of Patent: Feb. 25, 2025

(54) INSTALLATION STRUCTURE OF A TREE-SHAPED DECORATION

(71) Applicant: SHADLOO TRADING COMPANY LIMITED, Kowloon (HK)

(72) Inventor: Shiu Wing Michael Wu, Kowloon (HK)

(73) Assignee: SHADLOO TRADING COMPANY LIMITED, Kowloon (HK)

( * ) Notice: Subject to any disclaimer, the term of this patent is extended or adjusted under 35 U.S.C. 154(b) by 0 days.

(21) Appl. No.: 18/390,412

(22) Filed: Dec. 20, 2023

(65) Prior Publication Data

US 2024/0237843 A1 Jul. 18, 2024

(51) Int. Cl.
*F21V 23/00* (2015.01)
*A47G 33/06* (2006.01)

(52) U.S. Cl.
CPC ............ *A47G 33/06* (2013.01); *F21V 23/001* (2013.01)

(58) Field of Classification Search
CPC .............................. A47G 33/06; F21V 23/001
See application file for complete search history.

(56) References Cited

U.S. PATENT DOCUMENTS 1,590,220 A * 6/1926 Wurts .................... A41G 1/007 211/197
3,846,213 A * 11/1974 Thiemann .............. A47G 33/06 428/9
4,847,123 A * 7/1989 Armstead .............. A47G 33/06 428/9
5,455,750 A * 10/1995 Davis ........................ F21S 4/10 428/18

* cited by examiner

*Primary Examiner* — Thomas M Sember
(74) *Attorney, Agent, or Firm* — WPAT, PC

(57) ABSTRACT

An installation structure of tree-shaped decoration includes a tree trunk and decorative branches. Two or more sets of hanging fittings are provided on the trunk along the axial direction. A plurality of decorative branches are connected to the hanging fittings and arranged according to the arrangement of the tree-shaped decoration. There are simulated decorations distributed on the decorative branches. The top of the decorative branches is provided with a hook to connect to a hanging setting. The decorative branches are also connected to at least one or more support rods along the extension direction. The other end of the support rods connects to another hanging fitting. The decorative branches can be batch-produced and hung to the trunk by the hanging fittings by adjusting the support rods according to the requirements of the tree shape. So, the installation is simple and quick. The tree decoration has good simulation effects while reducing the materials costs.

4 Claims, 5 Drawing Sheets

INSTALLATION STRUCTURE OF A TREE-SHAPED DECORATION

FIELD OF THE INVENTION

The present invention relates a kind of decoration used for decorating festivals, especially a tree-shaped structure decoration.

BACKGROUND OF THE INVENTION

In various festivals, to increase the festive atmosphere, some scenes are usually decorated or embellished by decorations. For example in Christmas, the Christmas tree is generally the most common Christmas decoration. In the past, people usually brought an evergreen plant such as a pine tree indoors or outdoors during Christmas and decorated it with Christmas lights and colorful decorations. In modern, due to cost and environmental protection considerations, artificial Christmas trees have been widely used instead. There are many methods for making simulated Christmas trees. For example, the Chinese utility model patent with application Ser. No. 03/240,398.4 and publication number CNY2612318 disclosed a simple structure with retractable Christmas tree branches. The trunk is set on a coupling base, and then rods are hooked on the coupling base. The rods are simulated branches, and then the rods can be folded upward to reduce the volume for easy storage and transportation. However, to imitate a real Christmas tree more realistically, the structure requires a plurality of joints and rods to install the branches. So, the cost of the materials will remain high, and the manufacturing and installation will be very cumbersome.

SUMMARY OF THE INVENTION

In view of the aforesaid drawbacks of the prior art, the present invention provides an installation structure for tree-shaped decorations. As the decorative branches are batch-produced, a small number of hanging fittings are directly installed on the tree trunk according to the requirements, and the decorative branches are hung to the hanging fittings and the support rods are adjusted according to the tree shape. The installation is very simple and quick. The structure is highly simulated of the tree-shaped and reduces the use of materials to cut down the cost.

So, the invention provides the following solutions:

An installation structure of a tree-shaped decoration, wherein comprising: a tree trunk and a plurality of decorative branches, two or more sets of hanging fittings are arranged along the axial direction of the trunk, the decorative branches are hung to the hanging fittings and arranged according to the arrangement of the tree-shaped decorations, the decorative branch is distributed with simulation decorations and the top of the decorative branch is provided with a hook that is connected to a hanging fitting, one or more support rods are provided along the direction of the decorative branch, the other end of the support rod is connected to the hanging fitting which is not the one connected to the top of the decorative branch.

Furthermore, the hanging fittings provide perforations for connecting to the hook or the support rod in the direction surrounding the tree trunk, spacers are provided between the perforations to separate the decorative branches or the support rods.

Furthermore, the support rod and the decorative branch are connected through a hinge.

Furthermore, the hinge is a ring buckle that is set on the end of the support rod connecting to the decorative branch, and another ring buckle is set on the decorative branch at the connection position with the support rod, the two ring buckles are fastened.

Furthermore, the hinge is a pivot and a shaft hole cooperated which are provided on the decorative branches and the support rods.

Furthermore, the top of the tree trunk is also equipped with a tree top decoration, the bottom of the tree top decoration and the top of the tree trunk are respectively provided with a plug hole and a plug connector, the cross-sections of the inner wall of the plug hole and the outer wall of the plug connector are matched polygons.

Furthermore, comprises lighting fixtures which are set along the decorative branch, the power lines of the lighting fixture and the simulation decorations tangle along the decorative branches.

Compared with existing technology, the utility model has the following advantages: the trunk can set a corresponding number of hanging fittings according to the design of the tree-shaped decorations. And, the decorative branches can also be equipped with corresponding simulated decorations, such as leaves, branches, flowers, pendants, etc., the top of the decorative branches is hung on a hanging fitting, then the decorative branches are propped up by the support rods according to the shape of the artificial tree decoration. The installation is completed and the process is very simple. When the product needs to be transported or stored, the decorative branches can be easily removed from the hanging fittings and arranged into strips to greatly reduce the volume for cutting down the transportation and storage costs. Generally, as for the artificial tree-shaped decoration, users are more concerned about whether the appearance of the decoration is close to a real tree, and they are not concerned about the internal structure of the decoration. Therefore, the structure of the present invention doesn't need to use many decorations inside and only uses the simulated decoration on the decorative branches. The decorative branches are propped up by the hanging fittings on the top and the support rods in the middle or lower part and it is not necessary to fill the gap between the decorative branches and the trunk with any decoration, thus saving a lot of simulated decorations. Arranging a reasonable number of decorative branches to fully cover the outer contour of the tree-shaped decorations, is enough to form a realistic imitation of real trees and solve the manufacturing cost problem.

BRIEF DESCRIPTION OF THE DRAWINGS

To further explain the technical solution of the present invention, the drawings are provided below.

DESCRIPTION OF THE EMBODIMENTS

To solve the technical problems, technical solutions, and beneficial effects to be solved by the present invention clearer, the present invention will be further described in detail below in conjunction with the accompanying drawings and embodiments. It should be understood that the specific embodiments described here are only used to explain the present invention and are not intended to limit the present invention.

Figure 1:
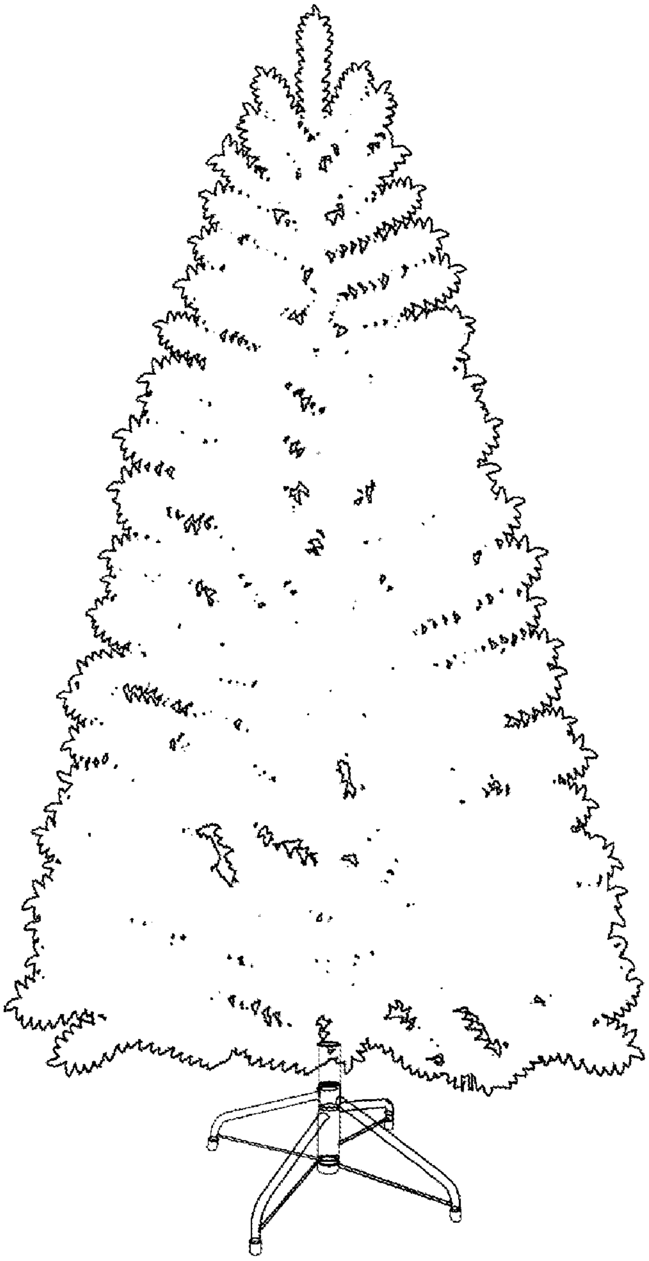
FIG. 1 is the perspective view of the present invention.
Figure 2:
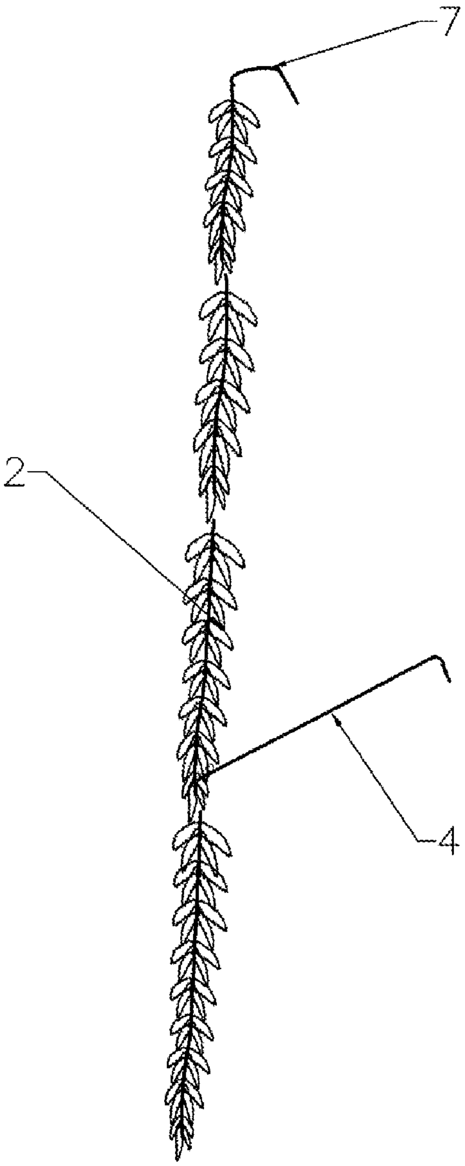
FIG. 2 is a schematic structural diagram of decorative branches.
Figure 3:
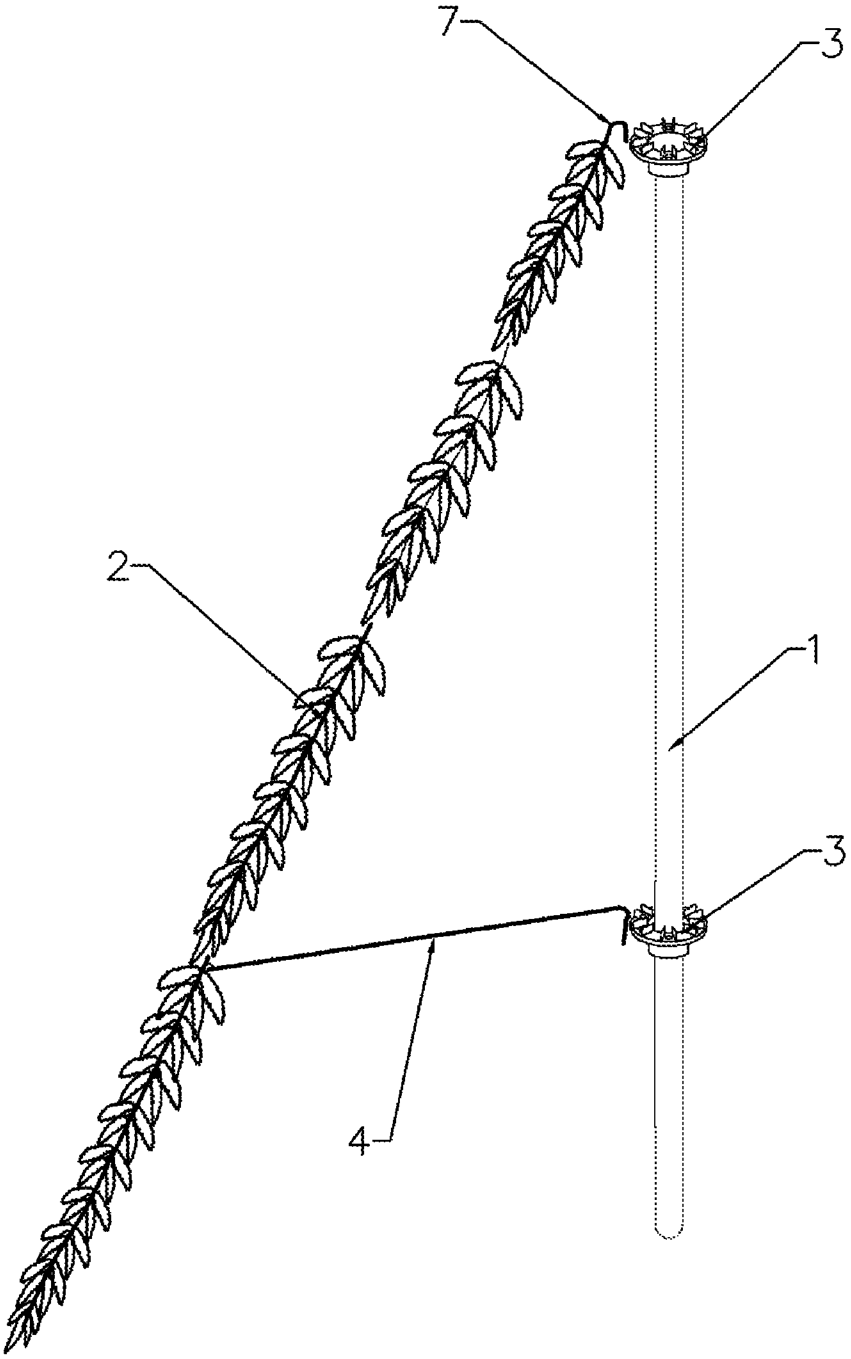
FIG. 3 is a structural schematic diagram of the installation of decorative branches and trunks.

Referring to FIG. 1 to FIG. 3, the tree-shaped decoration installation structure includes a tree trunk 1 and decorative branches 2. The tree trunk 1 is provided with two or more hanging fittings 3 along the axial direction, and the decorative branches 2 are hung to the hanging fittings 3 and arranged according to the arrangement of the tree-shaped decorations. The decorative branch 2 is distributed with simulated decorations, and the top of the decorative branch 2 is provided with a hook 7 to connect with a hanging fitting 3. The decorative branch 2 is also linked to at least one or more support rods 4 along the extension direction. The other end of the support rod 4 is connected to the hanging fitting 3 which is not the one connected to the top of the decorative branch 2. The trunk 1 can set a corresponding number of hanging fittings 3 according to the design of the tree-shaped decorations. And, the decorative branches 2 can also be equipped with corresponding simulated decorations, such as leaves, branches, flowers, pendants, etc., the top of the decorative branches 2 is hung on a hanging fitting 3, then the decorative branches 2 are propped up by the support rods 4 according to the shape of the artificial tree decoration. The installation is completed and the process is very simple. When the product needs to be transported or stored, the decorative branches can be easily removed from the hanging fittings 3 and arranged into strips to greatly reduce the volume for cutting down the transportation and storage costs. Generally, as for the artificial tree-shaped decoration, users are more concerned about whether the appearance of the decoration is close to a real tree, and they are not concerned about the internal structure of the decoration. Therefore, the structure of the present invention doesn't need to use many decorations inside and only uses the simulated decoration on the decorative branches 2. The decorative branches 2 are propped up by the hanging fittings 3 on the top and the support rods 4 in the middle or lower part and it is not necessary to fill the gap between the decorative branches 2 and the trunk 1 with any decoration, thus saving a lot of simulated decorations. Arranging a reasonable number of decorative branches 2 to fully cover the outer contour of the tree-shaped decorations, is enough to form a realistic imitation of real trees and solve the manufacturing cost problem.

Figure 5:
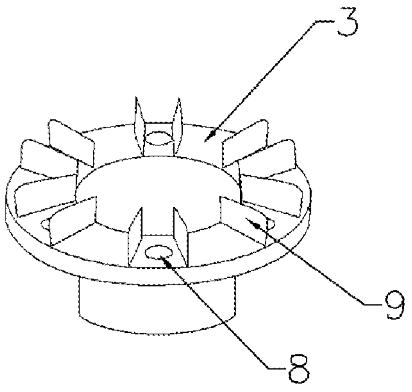
FIG. 5 is an enlarged view of the hanging fitting.

In order to facilitate the connection and installation of the decorative branches 2 to the hanging fittings 3, the hanging fitting 3 is provided with perforations 8 connected to the hooks 7 or the support rods 4 in the direction surrounding the tree trunk 1. The connection end of the corresponding support rod 4 connected to the hanging fitting 3 also provides a hook, making it easier to install with the hanging fitting. Considering easy for users to hang the decorative branches 2, and ensuring decorative branches 2 better conform to the outline of the tree-shaped decorations, spacers are provided between the perforations. The spacers are used to separate and position the decorative branches 2 or the support rods 4 to prevent the decorative branches 2 from being twisted or deformed due to misplaced installation which affects the appearance, referring to FIG. 5.

Figure 4:
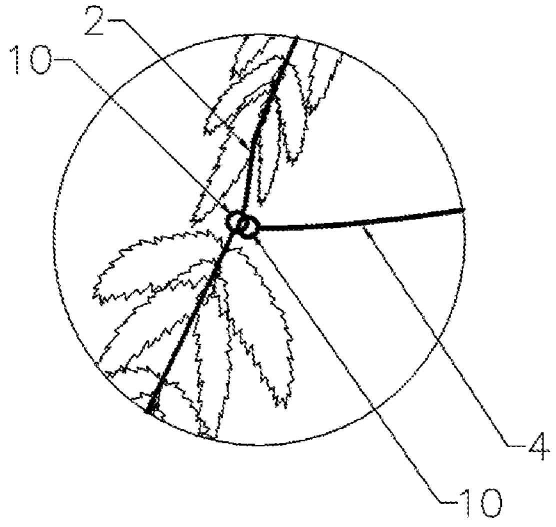
FIG. 4 is a partially enlarged view of position A in FIG. 3.

The support rod 4 is designed to hold up the decorative branch 2 to the appropriate position to form the entire tree-shaped decoration. As long as the support rod 4 and the decorative branch 2 can be reliably connected after installation, the support rod 4 and the decorative branch 2 can be separable. However, it is not ideal to store the support rod 4, and causes trouble in installing the support rod 4 and the decorative branch 2. So, the preferred solution of the present invention is to assemble the support rod 4 with the decorative branch 2 through a hinge. It can ensure that the support rod 4 and the decorative branch 2 remain connected to prevent the loss of accessories, especially the support rod 4, and can also be stored together to reduce the occupied volume by folding. When the top of the decorative branch 2 and the support rod 4 are connected to the hanging fittings 3 of the tree trunk 1, the decorative branch 2, the support rod 4, and the tree trunk 1 form a stable triangular structure, thereby ensuring the stability of the structural stability after installation. Of course, the said hinge connection can be realized in different ways, and the inventor provides the following two specific implementation embodiments. One is that a hinge is a ring buckle 10 which is provided at the end of the support rod 4 connected with decorative branch 2. The corresponding connection position of the decorative branch 2 with the support rod 4 is also provided with a ring buckle 10. The two ring buckle 10 are connected referring to FIG. 4. The decorative branches 2 and the support rods 4 are generally made of metal rods, so the ring buckle 10 is formed by bending the connection position of the two parts and the structure is very simple and easy to implement. The other method is to provide a pivot shaft and an axis hole between the decorative branch 2 and the support rod 4 respectively. By the rotation between the pivot shaft and the axis hole, the support rod 4 and the decorative branch 2 can also be rotated and applied to the situation when one decorative branch 2 is supported by multiple support rods 4. For example, for a relatively large tree-shaped decoration, the decorative branch 2 is long to need a plurality of the support rods 4 added in the middle to reinforce or adjust the shape of the decorative branch 2 by the support rod 4 to meet the requirement and so on.

Figure 6:
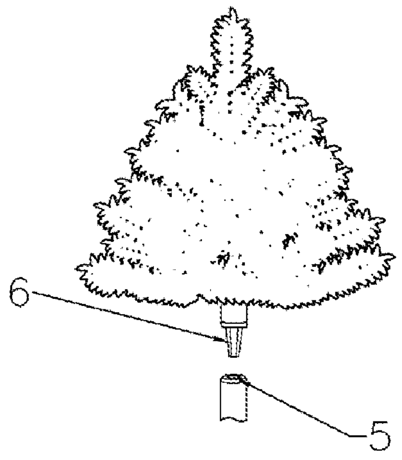
FIG. 6 is a schematic structural diagram of the tree top and trunk installation.

Although the hanging fittings 3 can be directly installed on the top of the tree trunk 1 and the decorative branches 2 can be installed directly from the top, the actual effect is not satisfactory because the branches at the top of the tree-shaped decoration will be relatively sparse and it is difficult to achieve better simulation effects simply by hanging decorative branches 2. Therefore, the inventor preferably installs a corresponding tree top or other decorative objects on the top of the tree trunk 1 through an insertion structure, as shown in FIG. 6. The plug-in structure is also relatively simple, and the plug hole 5 and the plug connector 6 is preferable for plug-in connection. However, in consideration of the reliability of the connection, the inner wall of the plug hole 5 and the outer wall are set as polygons in cross-section to match each other. With the cooperation of the polygons, it is more accurate installation positioning.

For holiday decorations, lights are usually hung. So, the present invention also adds lighting. Of course, the lighting can be individually bought by the user as the finished product and then wrapped around the tree-shaped decoration. However, the power lines of the lighting will be exposed and affect the aesthetics. For this reason, one option is that the present invention arranges the lighting along the decorative branches 2, and then the power lines are set and twisted along the decorative branches 2. The power lines of the lighting are hidden in the decorative branches 2, and then the power lines between the decorative branches 2 can be connected through the preset plug, which does not affect the disassembly and assembly of the decorative branches 2, and makes the assembled tree-shaped decoration more integral and beautiful as a whole. When it is necessary, the user only needs to turn on the power to make it light, and it is safer and more convenient to use.

The above are only preferred embodiments of the present utility model and are not intended to limit the present invention. Any modifications, equivalent substitutions, and improvements made within the principles of the present utility model shall be included in the present utility model, within the scope of protection.

What is claimed is:

1. An installation structure of a tree-shaped decoration, comprising:

a tree trunk;

a plurality of decorative branches;

two or more sets of hanging fittings arranged along an axial direction of the trunk, wherein each hanging fitting has a first end and a second end; and one or more support rods provided along a direction of the decorative branch;

wherein the decorative branches are hung to the hanging fittings and arranged according to an arrangement of the tree-shaped decorations, the decorative branch is distributed with simulation decorations, a top of the decorative branch is provided with a hook, one first end of one of the hanging fitting is connected to the hook, and one second end of the one of the hanging fitting is connected to a corresponding support rod; and wherein the support rod and the decorative branch are connected through a first ring buckle and a second ring buckle, the first ring buckle is set on the second end of the corresponding support rod, and the second ring buckle is set on the decorative branch at the connection position with the support rod, and the first ring buckle and the second ring buckle are fastened.

2. The installation structure of the tree-shaped decoration of claim 1, wherein the hanging fittings provide perforations for connecting to the hook or the support rod, and spacers are provided between the perforations and the decorative branches, or between the perforations and the support rods.

3. The installation structure of the tree-shaped decoration of claim 1, wherein a top of the tree trunk is also equipped with a tree-top decoration, a bottom of the tree top decoration and the top of the tree trunk are respectively provided with a plug hole and a plug connector, and a cross-sections of an inner wall of the plug hole and an outer wall of the plug connector are matched polygons.

4. The installation structure of the tree-shaped decoration of claim 1, further comprises lighting fixtures which are set along the decorative branch, wherein power lines of the lighting fixture and the simulation decorations tangle along the decorative branches.

* * * * *